(No Model.) 3 Sheets—Sheet 1.
J. F. WINCHELL.
CORN HARVESTER.
No. 510,945. Patented Dec. 19, 1893.
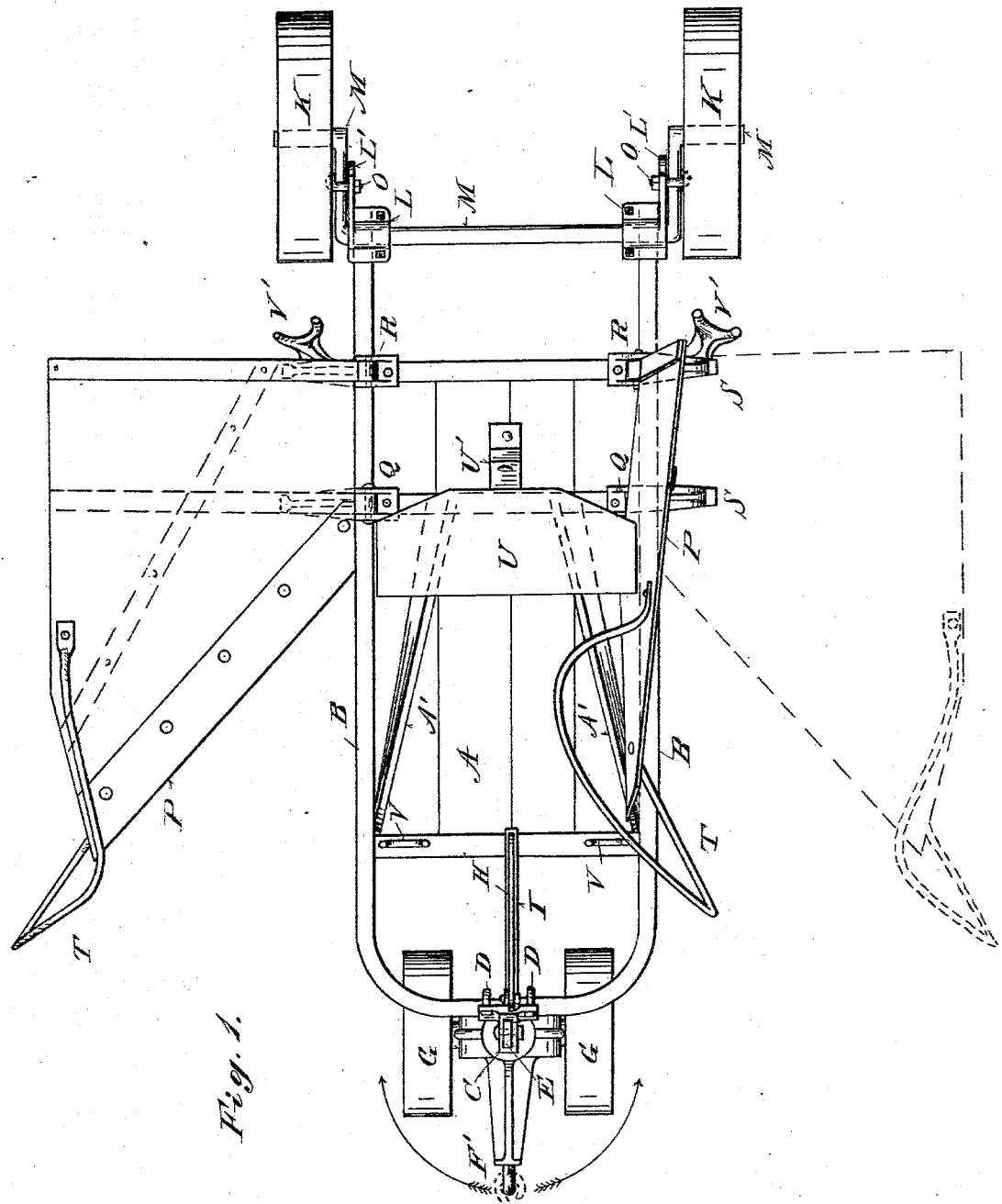
WITNESSES:
H. M. Plaisted.
F. B. Ernest.
INVENTOR
James Frank Winchell,
BY H. A. Toulmin
his ATTORNEY

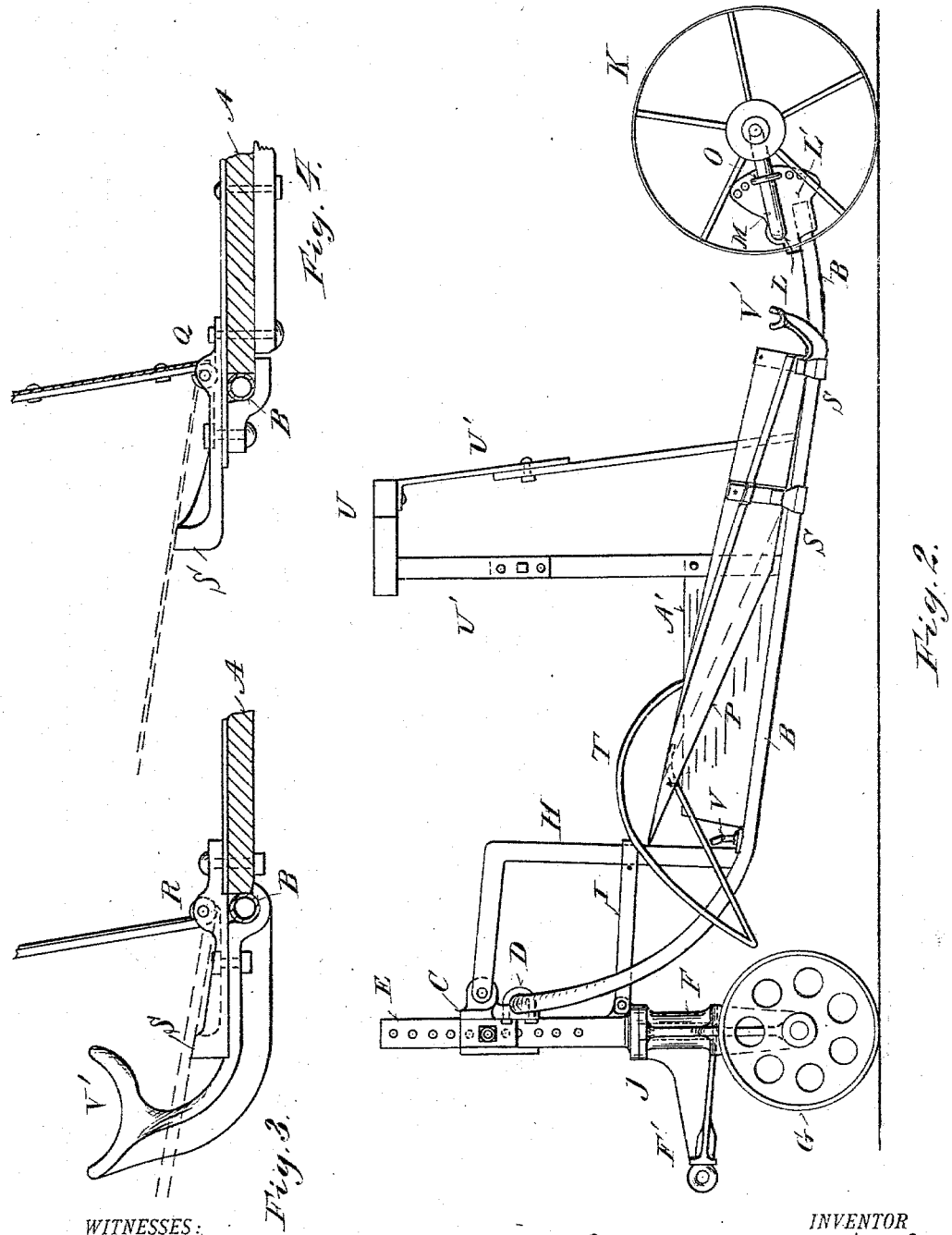

(No Model.) 3 Sheets—Sheet 3.

J. F. WINCHELL.
CORN HARVESTER.

No. 510,945. Patented Dec. 19, 1893.

WITNESSES:
H. M. Plaistd.
F. B. Ernest

INVENTOR
James Frank Winchell,
BY H. A. Toulmin,
His ATTORNEY.

UNITED STATES PATENT OFFICE.

JAMES F. WINCHELL, OF SPRINGFIELD, OHIO, ASSIGNOR TO THE FOOS MANUFACTURING COMPANY, OF SAME PLACE.

CORN-HARVESTER.

SPECIFICATION forming part of Letters Patent No. 510,945, dated December 19, 1893.

Application filed July 29, 1892. Serial No. 441,573. (No model.)

*To all whom it may concern:*

Be it known that I, JAMES FRANK WINCHELL, a citizen of the United States, residing at Springfield, in the county of Clark and State of Ohio, have invented certain new and useful Improvements in Corn-Harvesters, of which the following is a specification, reference being had therein to the accompanying drawings.

My invention relates to certain new and useful improvements in corn harvesters.

The object of my improvements is to provide means for harvesting corn, in which the cutting blade acts on the corn with a draw-cutting or inclined action, and tends to depress the stubble instead of tending to pull it out at the roots; also to support the cutting blades and cut corn, by the stubble reacting against the blades as they pass over it. The peculiarities of construction and operation whereby my improvements are carried out in this exemplification therefor, will be hereinafter described and claimed.

Figure 5:
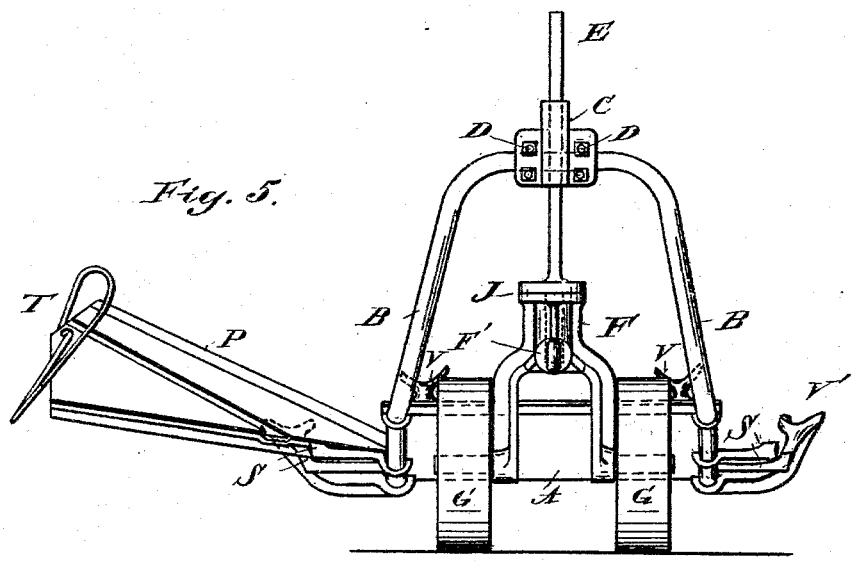

In the accompanying drawings on which like reference letters indicate corresponding parts: Figure 1 represents a plan view of my machine with one of the blades raised; Fig. 2, a side view of the same with the blade down; Fig. 3, an enlarged view of a stirrup and portion of the frame,—a portion of the blade being shown raised, and dotted in its lower position; Fig. 4, a detail view of one of the supports for the blade and a portion of the frame; Fig. 5, a front view of the machine; and Fig. 6, a detailed perspective view of the rear adjustment of the platform.

In the ordinary corn harvesters it has been found that the knife frequently acts to pull the stubble out by the roots in cutting the corn stalks, dragging the partially cut stalks and roots along and clogging the blades; also the weight of the cut corn upon the blades and supports, acts to depress the cutting edge and diminish its efficiency.

In my device hereinafter described, I provide a cutting edge inclined downward from the forward end toward the rear, and also incline the blade itself rearwardly from the edge thereof, whereby the cutting blade acts on the corn with a draw-cut action, and as it passes over the stubble, it depresses the same, on account of the rear of the blade being lower than the front, so that the stubble assists in supporting the blade.

I will now describe one means whereby my improvements are carried into effect.

Figure 6:
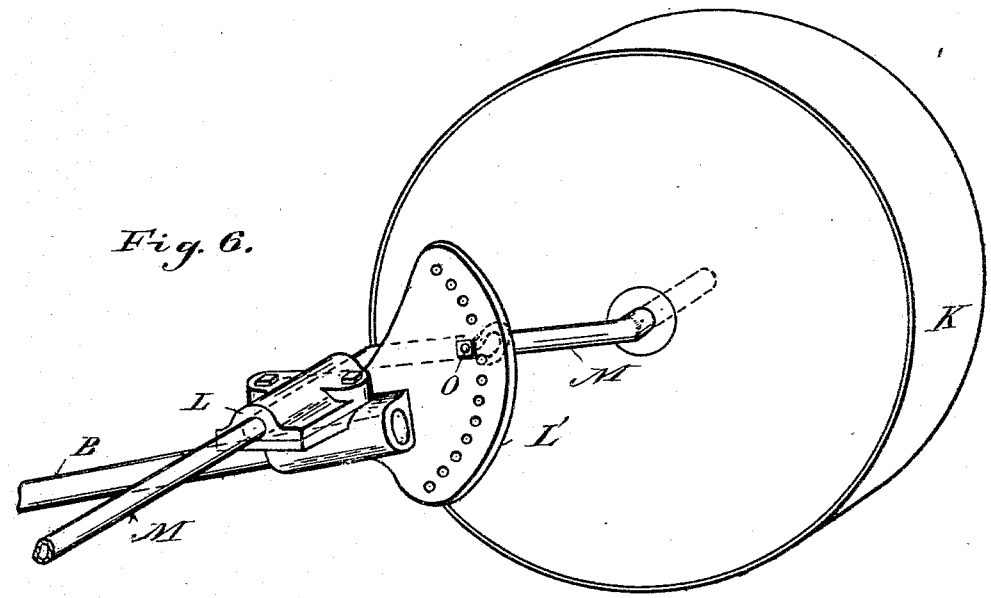

Referring to the accompanying drawings, the letter A designates a platform having side bars B, forming a loop and bent upward in front as shown in Figs. 1 and 2. A bracket-head C, receives the loop portion of the frame which is secured thereto by U-bolts D, or otherwise, and is provided with a slot for the stem E, pivoted to the yoke-head F, supported by the wheels G, as shown in Figs. 1 and 5. The forward projection F' affords an attachment for the draft animal. The front end of the frame or platform has a forward, upwardly extending or bent brace H, pivoted to the lug on the bracket head, as shown in Fig. 2. This brace is inclosed by a strip I, connected to the stem below the bracket head and adjustable on the brace. The draft-strain is therefore taken by the strap and carried to the brace H. The connection of the stem with the yoke-head is by a center plate pivot at J; the bracket head C is secured by a bolt or pin, at different heights in the perforations in the stem E, to adjust the forward end of the platform as desired. The rear end of the platform is supported by carrying wheels K through an adjustable connection with the side-bars B, which consists of a bearing L for the rear crank axle M, Fig. 1, and a segment wing L' having holes in which the hook bolt O is adjusted according to the height it is desired to support the rear of the platform. The rear ends of the side-bars B are fixed in said bearing L as shown in Figs. 1 and 6. Thus the platform itself may be adjusted at any suitable inclination according to the height of the corn cut. Upon this platform are mounted cutting blades P Fig. 1, by means of strap hinges Q and R, said blades being secured to wings, which the strap hinges also assist in bracing, as shown in Figs. 1 and 2. The wings are supported by projections or bracket arms S, from the platform, which cause the wings and attached blades to assume an inclined position inward and rearward as shown in Figs. 2 and 5. Guides T, carried by the wings, direct the standing corn to the cutting blades, and the blades cut the cornstalks obliquely; and as the wings pass over the stubble, it presses upward against the wings, materially assisting the projecting arms to bear the weight of the blades and cut corn. Thus when cutting, the action of the blades or wings, instead of being upward upon the stalks, tends to press the roots into the ground instead of pulling them out.

A seat U is carried by the platform on adjustable supports U', and a man sitting on one end of the seat braces one foot in a forward stirrup V and the other foot in a rear stirrup V' supported on a bracket arm extending out from the platform as seen in Fig. 3, to the rear of the cutting blade on the pivoted wing. Thus his weight is not in the least supported by the blade-wing, and does not act to depress the same. I have also shown in Fig. 1 the position the blade-wing assumes when thrown up. It will be seen that the machine is readily turned in a small space, by the cut-under arrangement of the forward connection with the wheels; and that the inclination and height of the cutting blades may be changed by the adjustable front and rear connections with the supporting wheels.

Referring to Figs. 1 and 2, I have shown a board or piece A' between the stirrup or rest V and the wing carrying the blade. The object of this is to cause the operator to lift the foot resting on the stirrup V, above the blade, when he swings around to the rear as he sits on the seat. Since the blade extends above the platform in the construction shown, he is thus prevented from any chance of striking his foot upon the blade by carelessness in not raising his foot while thus swinging about. This guard thus located, and extending toward the seat as shown, causes him to raise his foot. The downward and inward, and rearward position of the cutting blades or wings, causes the downward action on the stubble as the cutting action takes place, and also tends to carry the stalks inward toward the frame, instead of forcing the stalks away from the machine. The butts of the stalks will thus slide over the blade wings inward and rearward, and the wings will press down against the stubble as they pass over it, as above described.

Having thus fully described my invention, what I claim as new, and desire to secure by Letters Patent, is—

1. In a corn harvester, the combination with a main frame consisting of a loop portion extending forward and upward, a rotatable bracket-head and stem supporting said loop portion, supporting wheels for said head, an adjustable collar mounted on the stem, an angle strap from said collar to said frame, a draft strap from said stem to said angle strap to carry draft strains to the frame and brace the stem, and means to support the rear of said frame.

2. In a corn harvester, the combination with a pipe in the form of a loop extending forward and upward, substantially as shown and described, and forming the side rails of a platform, brackets for the rear ends of said rails, a crank axle adjustably mounted in said brackets and supporting wheels thereon, of a rotatable bracket head, and front carrying wheels, and stem portion for said head, a sliding collar adjustably mounted on said stem portion and supporting the loop of the platform frame, an angle strap from said collar extending backward and downward to the platform and a pivoted draft strap carried by said stem portion of the head, and adapted to engage with said angle strap and brace the same at any adjustment of the collar on said stem.

3. In a corn harvester, the combination with a frame and a foot-rest or stirrup carried thereby, and a wing also carried by said frame but independent of said foot-rest or stirrup, and a protecting board or guard extending from the rest or stirrup toward the operator's seat, and located between the rest or stirrup and the wing.

In testimony whereof I affix my signature in presence of two witnesses.

JAMES F. WINCHELL.

Witnesses:
OLIVER H. MILLER,
H. M. PLAISTED.